W. H. HOLDAM
Egg-Boxes.

No. 165,233.

Patented July 6, 1875.

WITNESSES:

INVENTOR:
W. H. Holdam
BY
ATTORNEYS.

UNITED STATES PATENT OFFICE.

WILLIAM H. HOLDAM, OF CRAB ORCHARD, KENTUCKY.

IMPROVEMENT IN EGG-BOXES.

Specification forming part of Letters Patent No. 165,233, dated July 6, 1875; application filed April 24, 1875.

*To all whom it may concern:*

Be it known that I, WILLIAM H. HOLDAM, of Crab Orchard, Lincoln county, Kentucky, have invented a new and Improved Egg-Box, of which the following is a specification:

The invention will first be described in connection with drawing, and then pointed out in claim.

Figure 1:
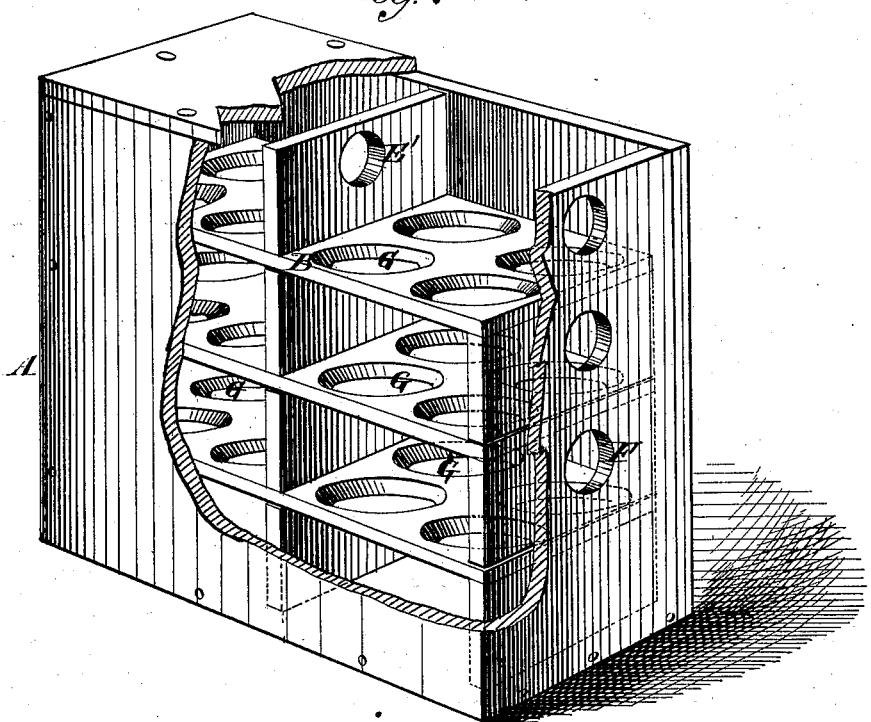
Figure 2:
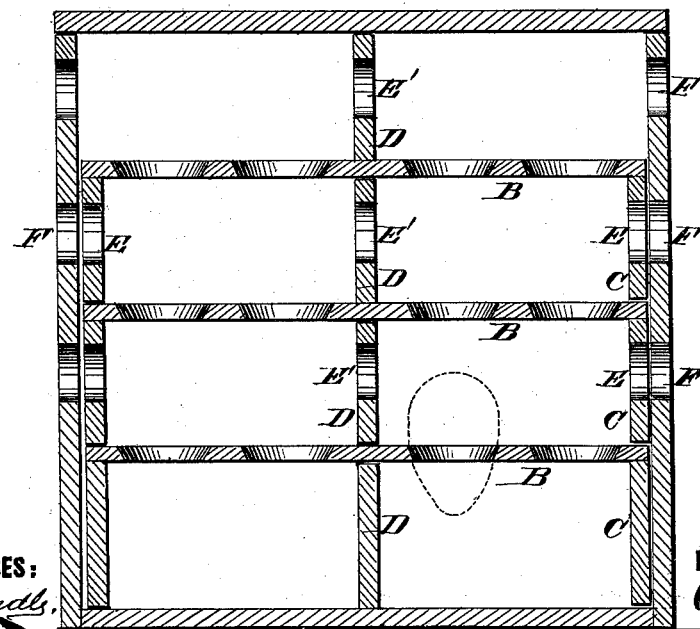

Figure 1 is a perspective view of the box, and Fig. 2 is a vertical section thereof.

Similar letters of reference indicate corresponding parts.

A is a plain box of any desired size and shape, having therein one or more horizontal plates, B. These partition-plates are made of wood, and have end pieces C attached to them on the under side, having holes E therein, the width of which pieces determines the distance the plates are from each other; also, vertical pieces, D, on the upper sides of the plates, in which are holes E'. F represents holes through the opposite sides of the box A. These holes are so located in the box that the holes E are in the line of sight looking through the box. In the horizontal plates B apertures G are made for the eggs, so that they may be set on end in the apertures separate from each other, and retain their places when the box is moved. These egg-orifices may be of different size, so that eggs of different weight may be contained in the same box. The compartments which contain the eggs may be marked to indicate the size of the eggs contained therein. When placed on end, as described, the eggs are not liable to spoil, and if covered with a coating of any suitable material to exclude the air, may be preserved for any period of time.

Having thus described my invention, I claim as new and desire to secure by Letters Patent—

The box A, having detachable egg-holders B, provided with subjacent spacing and supporting end pieces C C, as shown and described, so that each may be conveniently placed on a floor or table, and filled with eggs before being inserted in box.

WILLIAM HARDEN HOLDAM.

Witnesses:
H. E. MILLER,
WM. STUART.